United States Patent
Tong et al.

(10) Patent No.: US 7,394,860 B2
(45) Date of Patent: Jul. 1, 2008

(54) COMBINED SPACE-TIME DECODING

(75) Inventors: Wen Tong, Ottawa (CA); Ming Jia, Ottawa (CA); Jianglei Ma, Kanata (CA); Peiying Zhu, Kanata (CA); Dong-Sheng Yu, Ottawa (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 719 days.

(21) Appl. No.: 10/263,268

(22) Filed: Oct. 2, 2002

(65) Prior Publication Data

US 2004/0066866 A1 Apr. 8, 2004

(51) Int. Cl.
*H04B 7/02* (2006.01)
*H04L 1/02* (2006.01)

(52) U.S. Cl. ........................ 375/267; 375/347
(58) Field of Classification Search ................. 375/259, 375/260, 267, 316, 346, 347
See application file for complete search history.

(56) References Cited

U.S. PATENT DOCUMENTS

| | | | | |
|---|---|---|---|---|
| 5,966,412 | A * | 10/1999 | Ramaswamy | 375/341 |
| 6,127,971 | A * | 10/2000 | Calderbank et al. | 342/368 |
| 6,693,982 | B1 * | 2/2004 | Naguib et al. | 375/341 |
| 6,724,843 | B1 * | 4/2004 | Clarkson et al. | 375/347 |
| 6,898,248 | B1 * | 5/2005 | Elgamal et al. | 375/259 |
| 2001/0017903 | A1 | 8/2001 | Naguib et al. | 375/347 |
| 2001/0053143 | A1 * | 12/2001 | Li et al. | 370/344 |

OTHER PUBLICATIONS

Damen et al., "On the Effect of Correlated Fading on Several Space-Time Coding and Detection Schemes," IEEE 54th Vehicular Technology Conference Proceedings, Atlantic City, NJ, Oct. 7-11, 2001, vol. 1 of 4, pp. 13-16.
Naguib et al., "Applications of Space-Time Block Codes and Interference Suppression for High Capacity and High Data Rate Wireless Systems," Conference Record of the Thirty-Second Asilomar Conference on Signals, Systems, and Computers, Pacific Grove, CA, Nov. 1-4, 1998, pp. 1803-1810.
PCT International Search Report for PCT/IB03/04265, mailed Feb. 18, 2004.

* cited by examiner

*Primary Examiner*—Kevin M Burd
(74) *Attorney, Agent, or Firm*—Withrow & Terranova, PLLC

(57) ABSTRACT

The present invention relates to decoding space time coded (STC) signals transmitted from a number of transmit antennas. First, a separate detection technique is used to determine initial decoding solutions corresponding to the symbols transmitted from each of a number of transmit antennas at a given time. For each initial solution, a limited area about the initial solution is defined. Each of the limited areas will correspond to regions including constellation points proximate the initial solution. The initial solutions are used to define a limited, multi-dimensional space. Accordingly, the initial solutions are used to reduce the search complexity associated with joint decoding by defining a limited space about the initial solutions. Finally, a joint decoding technique is implemented within the limited space to find a final solution.

39 Claims, 8 Drawing Sheets

- POSSIBLE POINTS IN A 16 QAM CONSTELLATION
* RECEIVED SYMBOL BASE ON SEPARATE DETECTION SOLUTION
⊙ ACTUAL SYMBOL TRANSMITTED

COMBINED SPACE-TIME DECODING

FIELD OF THE INVENTION

The present invention relates to wireless communications, and in particular to adaptively controlling coding and modulation techniques in a wireless communication system incorporating space-time coding.

BACKGROUND OF THE INVENTION

Interference and fading are significant impediments to achieving high data rates in today's wireless communication systems. Given the tendency for channel conditions to sporadically and significantly fade, communication resources are conservatively allocated, leaving excessive amounts of communication resources unused most of the time. Efforts to combat the impact of fading include incorporating transmission diversity or controlling modulation and coding techniques in relation to channel conditions.

Spatial diversity is typically a function of the number and placement of transmit and receive antennas relative to a transmitter and receiver. Systems employing spatial diversity with multiple transmit and receive antennas are generally referred to as multiple-input multiple-output (MIMO) systems. Accordingly, a transmitting device will have M transmit antennas, and the receiving device will have N receive antennas. Space-time coding controls what data is transmitted from each of the M transmit antennas. A space-time encoding function at the transmitter processes data to be transmitted and creates unique information to transmit from the M transmit antennas. Each of the N receive antennas will receive signals transmitted from each of the M transmit antennas. A space-time decoding function at the receiving device will combine the information sent from the M transmit antennas to recover the data.

Space-time coding (STC) is typically implemented using one of two techniques. The first technique encodes the same data in different formats for transmission from the different transmit antennas. Thus, the same data is transmitted in different formats from each of the M transmit antennas. The second technique transmits different data from different ones of the M transmit antennas wherein the redundancy of the second technique is avoided. The first technique, space-time transmit diversity (STTD), is effective in maximizing diversity but inefficient due to the requisite redundancy. The second technique, which is often referred to as V-BLAST (Vertical-Bell Laboratories Layered Space Time), increases system throughput for systems having sufficient diversity available. Once a threshold amount of diversity is achieved, data rates increase linearly with the number of transmit and receive antennas for BLAST systems, whereas additional spatial diversity has little impact on data rates in STTD systems. Further information related to STTD and BLAST can be found in Siavash M. Alamouti, "A Simple Transmit Diversity Technique for Wireless Communications," IEEE J. Select. Areas Commun., vol. 16, pp. 1451-1458, October 1998; G. J. Foschini, "Layered Space-time Architecture for Wireless Communications in a Fading Environment when Using Multi-element antennas," Bell Labs Tech. J., pp. 41-59, Autumn 1996; G. D. Golden, G. J. Foschini, R. A. Valenzuela, and P. W. Wolniansky, "Detection Algorithm and Initial Laboratory Results Using V-BLAST Space-time Communication Architecture," Electronics Letters, vol. 35, pp. 14-16, January 1999; and P. W. Wolniansky, G. J., Foschini, G. D. Golden, and R. A. Valenzuela, "V-BLAST: An Architecture for Realizing Very High Data Rates Over the Rich-scattering Wireless Channel," Proc. IEEE ISSSE-98, Pisa, Italy, September 1998, pp. 295-300, which are incorporated herein by reference.

Prior to implementing space-time coding (STC), data to be transmitted is normally encoded to facilitate error correction, and modulated or mapped into symbols using any number of available modulation techniques, such as quadrature phase shift keying (QPSK) and x-quadrature amplitude modulation (QAM). The type of encoding for error correction and modulation techniques greatly influences the data rates, and their applicability is often a function of channel conditions.

In general, BLAST-type STC decoding techniques are defined as providing either joint or separate detection. For joint detection, to detect a signal from one antenna, the signals transmitted by all of the other antennas must also be considered. In essence, the signals are detected as a set, not on an individual basis as is done with separate detection techniques. The optimum algorithm to facilitate BLAST decoding is maximum likelihood decoding (MLD), which is a joint detection technique. MLD obtains a diversity order equal to the number of receive antennas, independent of the number of transmit antennas. Hence, compared to other techniques, MLD has a significant signal-to-noise ratio (SNR) advantage, and the SNR gain grows with the number of transmit antennas. One disadvantage of MLD is that its complexity grows exponentially with the number of transmit antennas. As such, the predominant decoding techniques for BLAST implement separate detection using minimum mean square error (MMSE) or zero-forcing (ZF), which are both significantly less complex than MLD techniques.

In operation, a ZF V-BLAST decoder operates to invert the MIMO channel and solve the information transmitted from M transmit antennas. Suppose the MIMO channel input is denoted as vector:

$$x = [x_1 x_2 \ldots x_M]^T, \qquad \text{Equation 1,}$$

the MIMO channel output is denoted as:

$$y = [y_1 y_2 \ldots y_N]^T, \text{ and} \qquad \text{Equation 2,}$$

the MIMO channel noise is denoted as:

$$n = [n_1 n_2 \ldots n_N]^T. \qquad \text{Equation 3,}$$

In the presence of noise, the V-BLAST decoder input can be represented as:

$$y = H_{N \times M} x + n. \qquad \text{Equation 4,}$$

The V-BLAST decoder performs MIMO channel estimation H, then the direct MIMO channel inversion leads to a zero-forcing solution, which is represented as:

$$\hat{x} = (H'H)^{-1} H' y \qquad \text{Equation 5}$$
$$= x + \varepsilon,$$

where $\hat{x}$ is the detected signal vector of x, and $\varepsilon = -(H'H)^{-1} H'n$ is the detection noise. Notably, in the derivation of Equation 5, perfect channel information is assumed; thus when n=0, $\varepsilon$=0.

When making hard-decision symbol estimates, the Euclidean distances between each detected signal $\{\hat{x}_l|_{l=1,M}\}$, which is represented as a point in a constellation, and all the possible signal candidates from a particular antenna, which are represented as several points in a constellation lattice, are calculated. Next, the candidate signal with the minimum distance to the detected signal is deemed to be the signal transmitted. Note that the detection process for each antenna is unrelated to signals transmitted from the other antennas. The same is true for soft-decision bit de-mapping. For instance, the sign and value of each soft bit de-mapped from the signal transmitted by the antenna $Tx_i$ are determined by $\hat{x}_i$ only, and are unrelated to $\{\hat{x}_j|_{j\neq i}\}$.

As noted above, MLD takes a joint detection approach. To detect which signal has been transmitted by antenna $Tx_i$, the decoder must consider signals transmitted by all the other antennas. As such, the signals are detected as a set. The maximum likelihood estimate of a signal vector x is given by:

$$\tilde{x}=arg\ min\|r-Hx\|,\qquad\text{Equation 6},$$

where x is the signal vector given in Equation 1, with $x_1 \in \{s_1, s_2, \ldots, s_q\}$ and $q=2^{n_b}$ being the constellation size. As shown from Equation 6, the detection is based on the Euclidean distance between received signal vector r and $q^M$ different candidate vectors Hx, where M is the number of transmit antennas.

The maximum likelihood estimate of a received signal vector is given by Equation 6, which expands the candidate signal constellation from one dimension to M dimensions. Accordingly, the complexity grows exponentially with the number of transmit antennas. With separate detection, the Euclidean distance calculation is always carried out in one dimension only:

$$\tilde{x}_l=arg\ min\|\hat{x}_l-x_l\|.\qquad\text{Equation 7}$$

Accordingly, the computational complexity of V-BLAST detection for separate detection techniques, such as ZF or MMSE, is linear with respect to the number of transmit antennas. However, the limitation for the separate detection techniques is twofold. First, the number of receiver antennas should be larger than the number of transmit antennas. Second, the diversity order with respect to the system performance is N−M+1. In contrast, the advantages of joint detection are that the diversity order for the MLD decoder is linear with the number of transmit antennas, and the number of receive antennas can be less than the number of transmit antennas. However, the disadvantage of the joint detection is that the complexity of the MLD decoder is exponential to the number of transmit antennas. Thus, there is a need for a decoding technique capable of taking advantage of the benefits of both joint and separate decoding while minimizing their limitations. In particular, there is a need for the precision of MLD detection with the complexity closer to ZF or MMSE detection.

Further reference is made to Richard van Nee, Allert van Zelst and Geert Awater, "Maximum Likelihood Decoding in a Space Division Multiplexing System," *IEEE VTC* 2000, Tokyo, Japan, May 2000, and Andrej Stefanov and Tolga M. Duman, "Turbo-coded Modulation for Systems with Transmit and Receive Antenna Diversity over Block Fading Channels: System Model, Decoding Approaches, and Practical Considerations," *IEEE J. Select. Areas Commun.*, vol. 19, pp. 958-968, May, 2001, which are incorporated herein by reference.

SUMMARY OF THE INVENTION

The present invention relates to decoding space time coded (STC) signals transmitted from a number of transmit antennas. The decoding technique involves the following. First, a separate detection technique, such as zero-forcing (ZF) or minimum mean square error (MMSE), is used to determine initial decoding solutions corresponding to the symbols transmitted from each of a number of transmit antennas at a given time. For each initial solution, a limited area about the initial solution is defined. Each of the limited areas will correspond to regions including constellation points proximate the initial solution. The initial solutions are used to define a limited, multi-dimensional space. Accordingly, the initial solutions are used to reduce the search complexity associated with joint decoding by defining a limited space about the initial solutions. Finally, a joint decoding technique, such as maximum likelihood decoding MLD, is implemented within the limited space to find a final solution. In a further refinement of the present invention, the initial solutions may be derived from signals corresponding to only select transmit antennas, wherein successive MLD solutions are used to find the final, MLD solution to provide interference cancellation and reduce processing complexity.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention provides a space-time coding (STC) technique for receiving signals in a multiple-input multiple-output (MIMO) system where joint decoding is provided in an efficient and less complex manner than previously available. Instead of relying solely on separate decoding techniques, such as zero-forcing (ZF) or minimum mean square error (MMSE), or relying on joint decoding techniques, such as maximum likelihood decoding (MLD), a combination of separate and joint decoding is implemented. In general, the decoding technique involves the following. Initially, a separate detection technique is used to determine initial decoding solutions corresponding to the symbols transmitted from each of a number of transmit antennas at a given time. For each initial solution, a limited area about the initial solution is defined. Each limited area will correspond to regions including constellation points proximate the initial solution. The initial solutions are used to define a limited, multi-dimensional space. Accordingly, the initial solutions are used to reduce the search complexity associated with joint decoding by defining a limited space about the initial solutions. Finally, a joint decoding technique is implemented within the limited space to find a final solution. Other improvements and details are described further below. A high level overview of mobile terminal and base station architectures of the present invention are provided prior to delving into the structural and functional details of the decoding techniques of the present invention.

Figure 1:
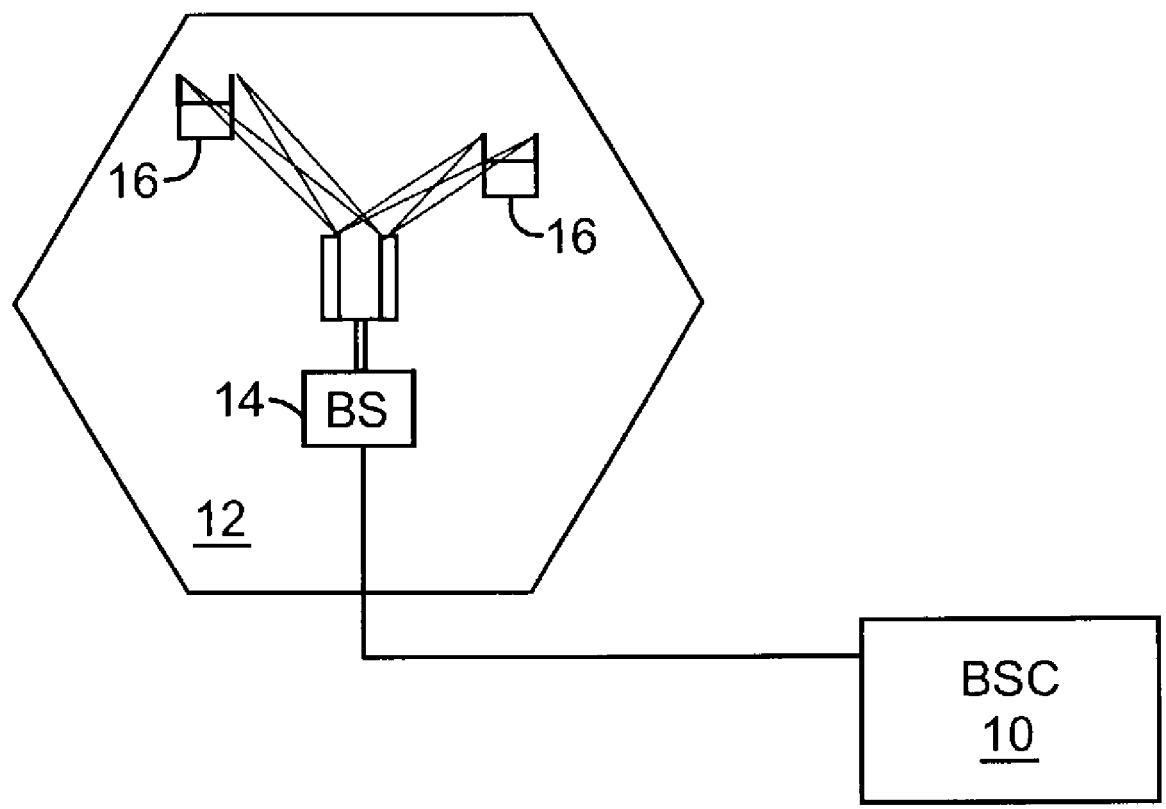
FIG. 1 is a block representation of a wireless communication system according to one embodiment of the present invention.

With reference to FIG. 1, a basic wireless communication environment is illustrated. In general, a base station controller (BSC) 10 controls wireless communications within multiple cells 12, which are served by corresponding base stations (BS) 14. Each base station 14 facilitates communications with mobile terminals 16, which are within the cell 12 associated with the corresponding base station 14. For the present invention, the base stations 14 and mobile terminals 16 include multiple antennas to provide spatial diversity for communications.

Figure 2:
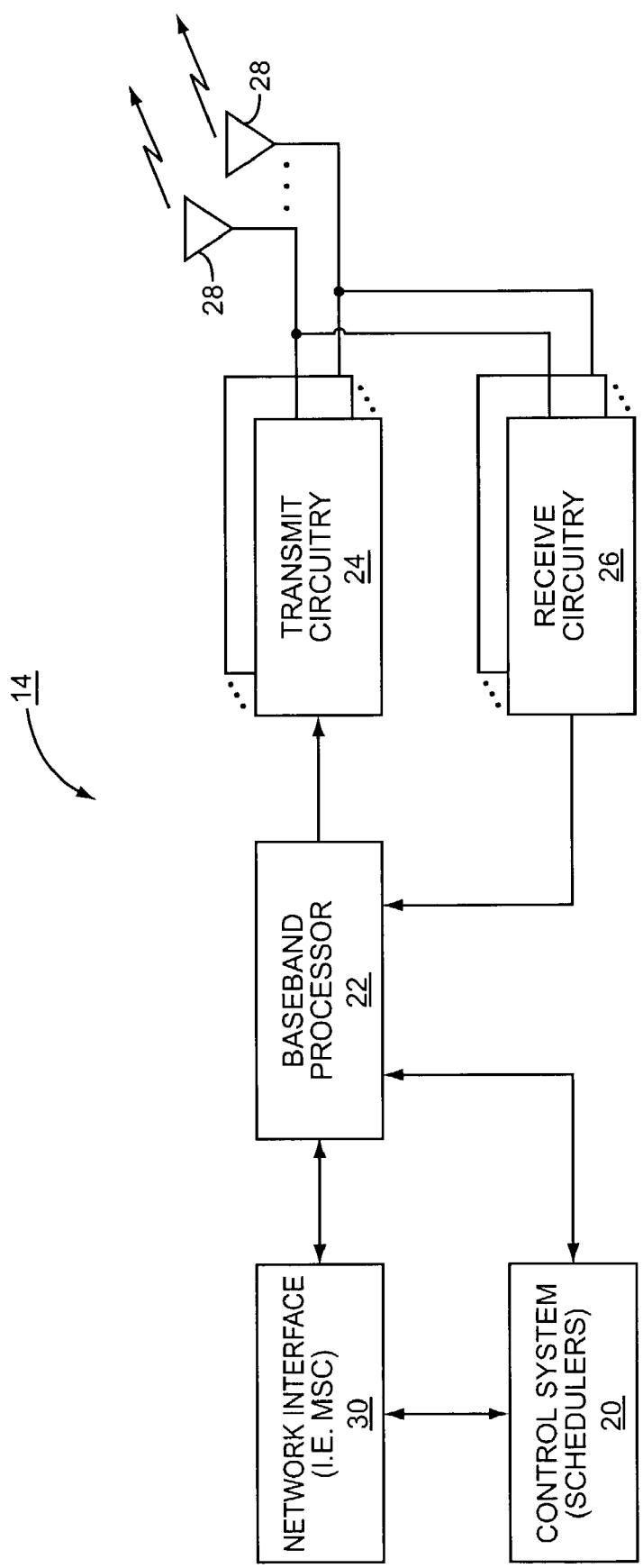
FIG. 2 is a block representation of a base station according to one embodiment of the present invention.

With reference to FIG. 2, a base station 14 configured according to one embodiment of the present invention is illustrated. The base station 14 generally includes a control system 20, a baseband processor 22, transmit circuitry 24, receive circuitry 26, multiple antennas 28, and a network interface 30. The receive circuitry 26 receives radio frequency signals through antennas 28 bearing information from one or more remote transmitters provided by mobile terminals 16. Preferably, a low noise amplifier and a filter (not shown) cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 22 processes the digitized received signal to extract the information or data bits conveyed in the received signal. This processing typically comprises demodulation, decoding, and error correction operations. As such, the baseband processor 22 is generally implemented in one or more digital signal processors (DSPs). The received information is then sent across a wireless network via the network interface 30 or transmitted to another mobile terminal 16 serviced by the base station 14. The network interface 30 will typically interact with the base station controller 10 and a circuit-switched network forming a part of a wireless network, which may be coupled to the public switched telephone network (PSTN).

On the transmit side, the baseband processor 22 receives digitized data, which may represent voice, data, or control information, from the network interface 30 under the control of control system 20, and encodes the data for transmission. The encoded data is output to the transmit circuitry 24, where it is modulated by a carrier signal having a desired transmit frequency or frequencies. A power amplifier (not shown) will amplify the modulated carrier signal to a level appropriate for transmission, and deliver the modulated carrier signal to the antennas 28 through a matching network (not shown). The multiple antennas 28 and the replicated transmit and receive circuitries 24, 26 provide spatial diversity. Modulation and processing details are described in greater detail below.

Figure 3:
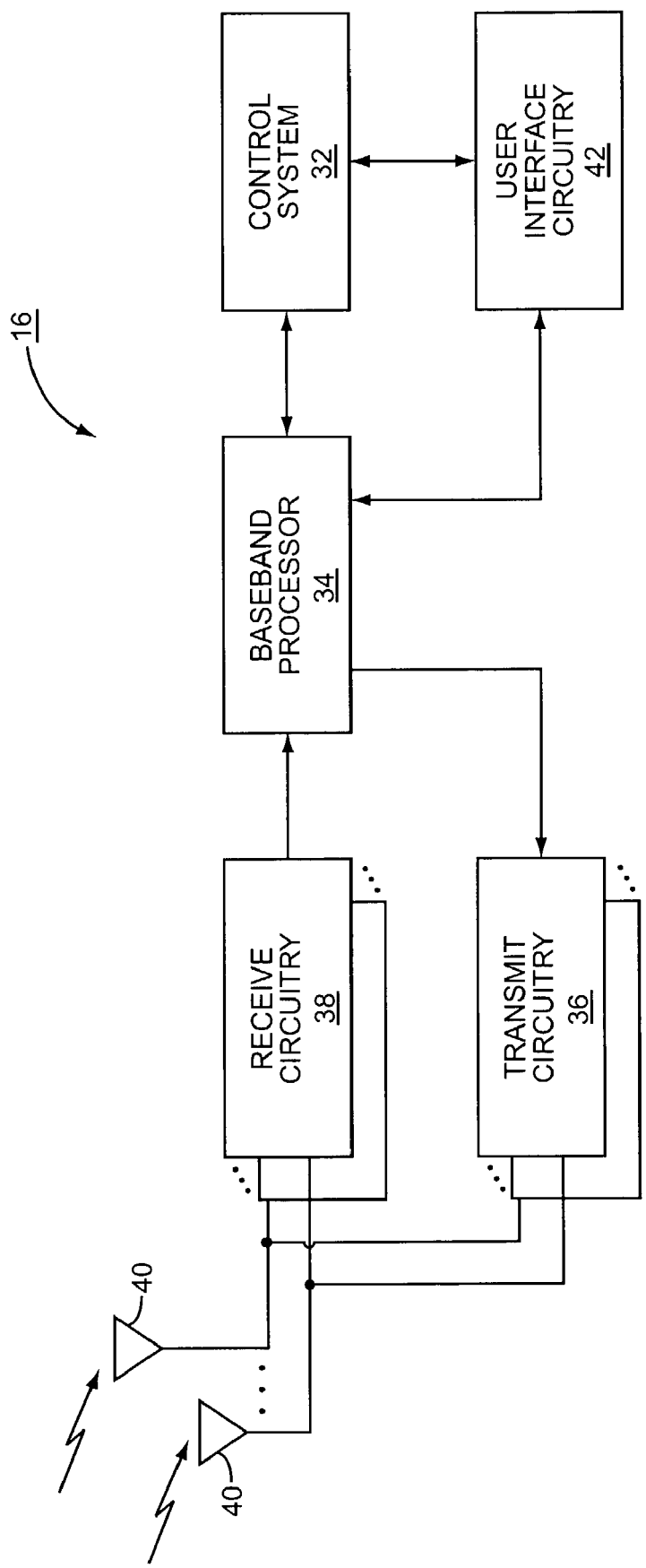
FIG. 3 is a block representation of a mobile terminal according to one embodiment of the present invention.

With reference to FIG. 3, a mobile terminal 16 configured according to one embodiment of the present invention is illustrated. Similarly to the base station 14, the mobile terminal 16 will include a control system 32, a baseband processor 34, transmit circuitry 36, receive circuitry 38, multiple antennas 40, and user interface circuitry 42. The receive circuitry 38 receives radio frequency signals through antennas 40 bearing information from one or more base stations 14. Preferably, a low noise amplifier and a filter (not shown) cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 34 processes the digitized received signal to extract the information or data bits conveyed in the received signal. This processing typically comprises demodulation, decoding, and error correction operations, as will be discussed on greater detail below. The baseband processor 34 is generally implemented in one or more digital signal processors (DSPs) and application specific integrated circuits (ASICs).

For transmission, the baseband processor 34 receives digitized data, which may represent voice, data, or control information, from the control system 32, which it encodes for transmission. The encoded data is output to the transmit circuitry 36, where it is used by a modulator to modulate a carrier signal that is at a desired transmit frequency or frequencies. A power amplifier (not shown) will amplify the modulated carrier signal to a level appropriate for transmission, and deliver the modulated carrier signal to the antennas 40 through a matching network (not shown). The multiple antennas 40 and the replicated transmit and receive circuitries 36, 38 provide spatial diversity. Modulation and processing details are described in greater detail below.

Figure 4:
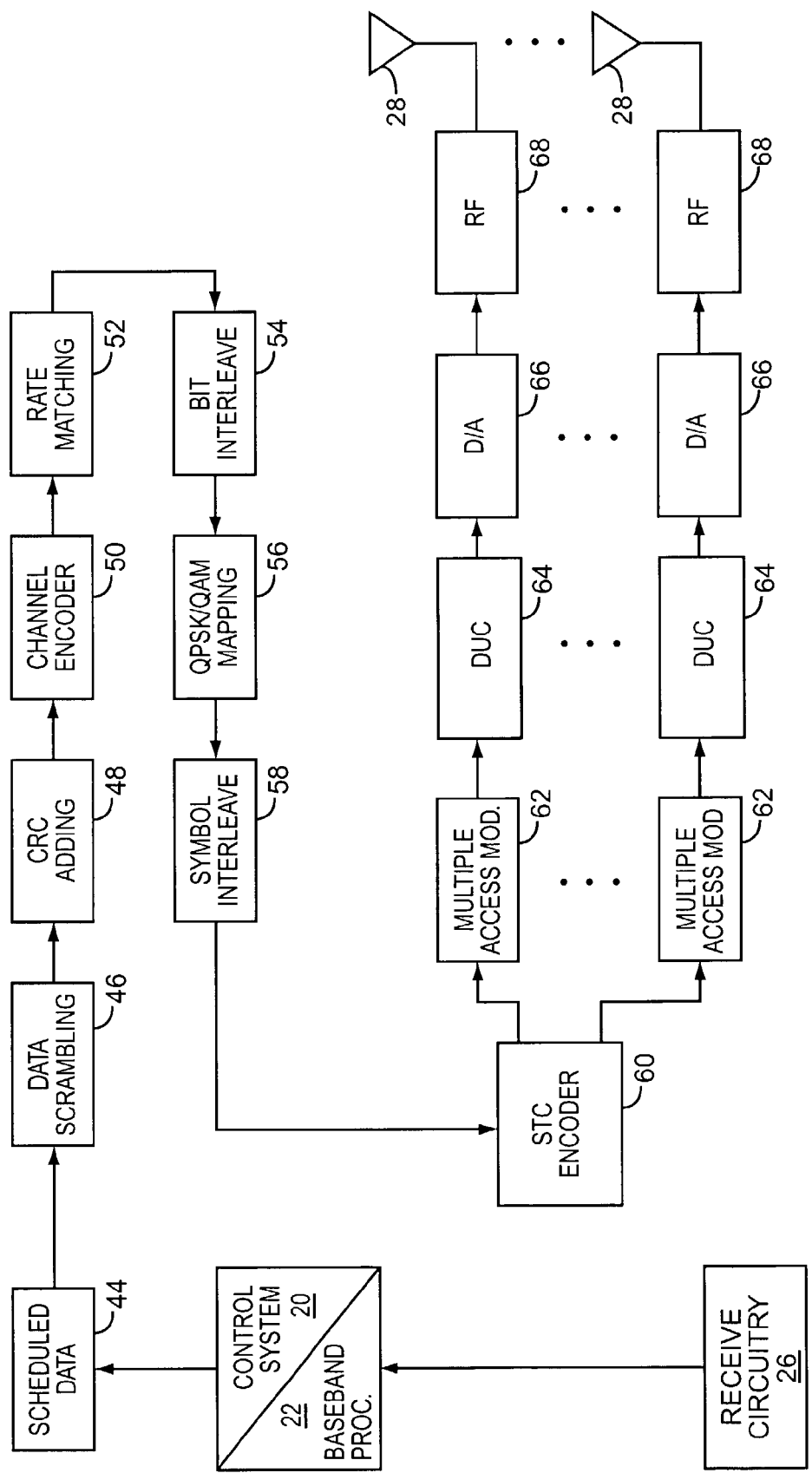
FIG. 4 is a logical breakdown of a transmitter architecture according to one embodiment of the present invention.

With reference to FIG. 4, a logical transmission architecture is provided according to one embodiment. The transmission architecture is described as being that of the base station 14, but those skilled in the art will recognize the applicability of the illustrated architecture for both uplink and downlink communications. Further, the transmission architecture is intended to represent a variety of multiple access architectures, including, but not limited to code division multiple access (CDMA), frequency division multiple access (FDMA), time division multiple access (TDMA), and orthogonal frequency division multiplexing (OFDM).

Initially, the base station controller 10 sends data 44 intended for a mobile terminal 16 to the base station 14 for scheduling. The scheduled data 44, which is a stream of bits, is scrambled in a manner reducing the peak-to-average power ratio associated with the data using data scrambling logic 46. A cyclic redundancy check (CRC) for the scrambled data is determined and appended to the scrambled data using CRC logic 48. Next, channel coding is performed using channel encoder logic 50 to effectively add redundancy to the data to facilitate recovery and error correction at the mobile terminal 16. The channel encoder logic 50 uses known Turbo encoding techniques in one embodiment. The encoded data is then processed by rate matching logic 52 to compensate for the data expansion associated with encoding.

Bit interleaver logic 54 systematically reorders the bits in the encoded data to minimize the loss of consecutive data bits. The resultant data bits are systematically mapped into corresponding symbols depending on the chosen baseband modulation by mapping logic 56. Preferably, a form of Quadrature Amplitude Modulation (QAM) or Quadrature Phase Shift Key (QPSK) modulation is used. The symbols may be systematically reordered to further bolster the immunity of the transmitted signal to periodic data loss caused by frequency selective fading using symbol interleaver logic 58.

At this point, groups of bits have been mapped into symbols representing locations in an amplitude and phase constellation. Blocks of symbols are then processed by space-time code (STC) encoder logic 60. The STC encoder logic 60 will process the incoming symbols according to a selected STC encoding mode and provide n outputs corresponding to the number of transmit antennas 28 for the base station 14. Further detail regarding the STC encoding is provided later in the description. At this point, assume the symbols for the n outputs are representative of the data to be transmitted and capable of being recovered by the mobile terminal 16. Further detail is provided in A. F. Naguib, N. Seshadri, and A. R. Calderbank, "Applications of space-time codes and interference suppression for high capacity and high data rate wireless systems," Thirty-Second Asilomar Conference on Signals, Systems & Computers, Volume 2, pp. 1803-1810, 1998; R. van Nee, A. van Zelst and G. A. Atwater, "Maximum Likelihood Decoding in a Space Division Multiplex System", IEEE VTC. 2000, pp. 6-10, Tokyo, Japan, May 2000; and P. W. Wolniansky et al., "V-BLAST: An Architecture for Realizing Very High Data Rates over the Rich-Scattering Wireless Channel," Proc. IEEE ISSSE-98, Pisa, Italy, Sep. 30, 1998 which are incorporated herein by reference in their entireties.

For illustration, assume the base station 14 has two antennas 28 (n=2) and the STC encoder logic 60 provides two output streams of symbols. Accordingly, each of the symbol streams output by the STC encoder logic 60 is sent to a corresponding multiple access modulation function 62, illustrated separately for ease of understanding. Those skilled in the art will recognize that one or more processors may be used to provide such analog or digital signal processing alone or in combination with other processing described herein. For example, the multiple access modulation function 62 in a CDMA function would provide the requisite PN code multiplication, wherein an OFDM function would operate on the respective symbols using inverse discrete Fourier transform (IDFT) or like processing to effect an Inverse Fourier Transform. Attention is drawn to co-assigned application Ser. No. 10/104,399, filed Mar. 22, 2002, entitled SOFT HANDOFF FOR OFDM, for additional OFDM details, and to RF Microelectronics by Behzad Razavi, 1998 for CDMA and other multiple access technologies, both of which are incorporated herein by reference in their entirety.

Each of the resultant signals is up-converted in the digital domain to an intermediate frequency and converted to an analog signal via the corresponding digital up-conversion (DUC) circuitry 64 and digital-to-analog (D/A) conversion circuitry 66. The resultant analog signals are then simultaneously modulated at the desired RF frequency, amplified, and transmitted via the RF circuitry 68 and antennas 28. Notably, the transmitted data may be preceded by pilot signals, which are known by the intended mobile terminal 16. The mobile terminal 16, which is discussed in detail below, may use the pilot signals for channel estimation and interference suppression and the header for identification of the base station 14.

Figure 5:
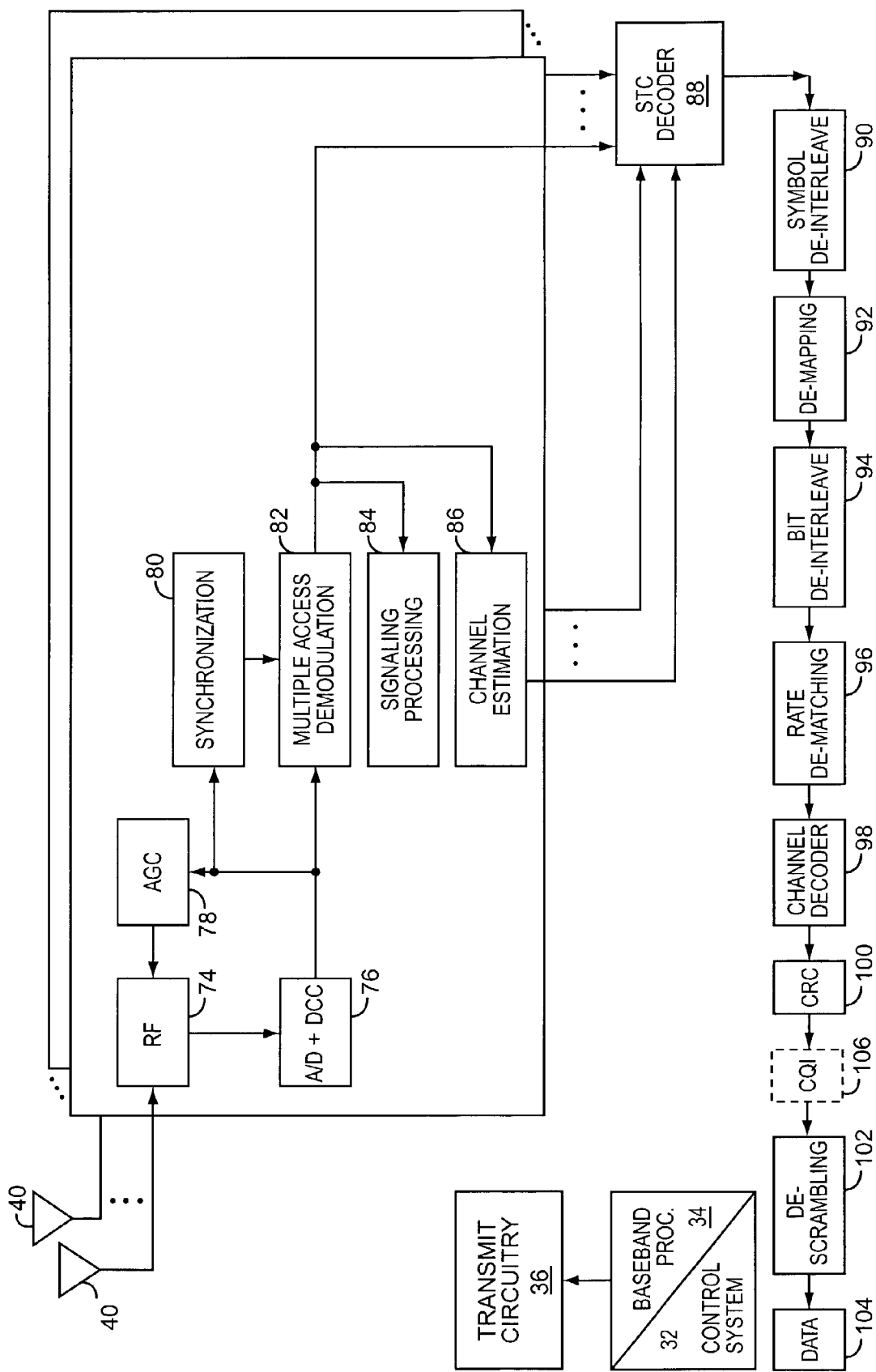
FIG. 5 is a logical breakdown of a receiver architecture according to one embodiment of the present invention.

Reference is now made to FIG. 5 to illustrate reception of the transmitted signals by a mobile terminal 16. Upon arrival of the transmitted signals at each of the antennas 40 of the mobile terminal 16, the respective signals are demodulated and amplified by corresponding RF circuitry 74. For the sake of conciseness and clarity, only one of the multiple receive paths in the receiver is described and illustrated in detail. Analog-to-digital (A/D) conversion and downconversion circuitry (DCC) 76 digitizes and downconverts the analog signal for digital processing. The resultant digitized signal may be used by automatic gain control circuitry (AGC) 78 to control the gain of the amplifiers in the RF circuitry 74 based on the received signal level.

The digitized signal is also fed to synchronization circuitry 80 and a multiple access demodulation function 82, which will recover the incoming signal received at a corresponding antenna 40 at each receiver path. The synchronization circuitry 80 facilitates alignment or correlation of the incoming signal with the multiple access demodulation function 82 to aid recovery of the incoming signal, which is provided to a signaling processing function 84 and channel estimation function 86. The signal processing function 84 processes basic signaling and header information to provide information sufficient to generate a channel quality measurement, which may bear on an overall signal-to-noise ratio for the link, which takes into account channel conditions and/or signal-to-noise ratios for each receive path.

The channel estimation function 86 for each receive path provides channel responses corresponding to channel conditions for use by an STC decoder 88. The symbols from the incoming signal and channel estimates for each receive path are provided to the STC decoder 88, which provides STC decoding on each receive path to recover the transmitted symbols. The channel estimates provide sufficient channel response information to allow the STC decoder 88 to decode the symbols according to the STC encoding used by the base station 14.

The recovered symbols are placed back in order using the symbol de-interleaver logic 90, which corresponds to the symbol interleaver logic 58 of the base station 14. The de-interleaved symbols are then demodulated or de-mapped to a corresponding bitstream using de-mapping logic 92. The bits are then de-interleaved using bit de-interleaver logic 94, which corresponds to the bit interleaver logic 54 of the transmitter architecture. The de-interleaved bits are then processed by rate de-matching logic 96 and presented to channel decoder logic 98 to recover the initially scrambled data and the CRC checksum. Accordingly, CRC logic 100 removes the CRC checksum, checks the scrambled data in traditional fashion, and provides it to the de-scrambling logic 102 for de-scrambling using the known base station de-scrambling code to recover the originally transmitted data 104.

A channel quality indicator (CQI) may be determined based on the recovered data. An additional or alternative CQI function 106 may be provided anywhere along the data recovery path (blocks 90 through 104) to monitor signal-to-noise ratios, error rates, and like to derive information bearing on individual or overall channel quality. Additional information on one exemplary way to determine a CQI value is provided in co-assigned application Ser. No., 60/329,511, filed Oct. 17, 2001, and entitled "METHOD AND APPARATUS FOR CHANNEL QUALITY MEASUREMENT FOR ADAPTIVE MODULATION AND CODING."

The following describes the overall functionality of the present invention and refers to the primary device used for transmission as the transmitter and the device used for receiving as the receiver. At any given time depending on the direction of primary communications, the base station 14 and the mobile terminals 16 may be a transmitter, receiver, or both.

The present invention reduces the complexity associated with MLD decoding with respect to the transmit modulation by setting it to a fixed value, which is invariant to the QAM size. Further, the MLD decoding complexity becomes linear, instead of exponential, to the number of transmit antennas. In general, the decoding technique involves the following. First, a separate detection technique, such as ZF or MMSE, is used to determine initial decoding solutions corresponding to the symbols transmitted from each of a number of transmit antennas at a given time. For each initial solution, a limited area about the initial solution is defined. Each of the limited areas will correspond to regions including constellation points proximate the initial solution. The initial solutions are used to define a limited, multi-dimensional space. Accordingly, the initial solutions are used to reduce the search complexity associated with joint decoding by defining a limited space about the initial solutions. Finally, a joint decoding technique, such as MLD, is implemented within the limited space to find a final solution. In a further refinement of the present invention, the initial solutions may be derived from signals corresponding to only select transmit antennas, wherein successive MLD solutions are used to find the final, MLD solution to provide interference cancellation and reduce processing complexity.

Figure 6A:
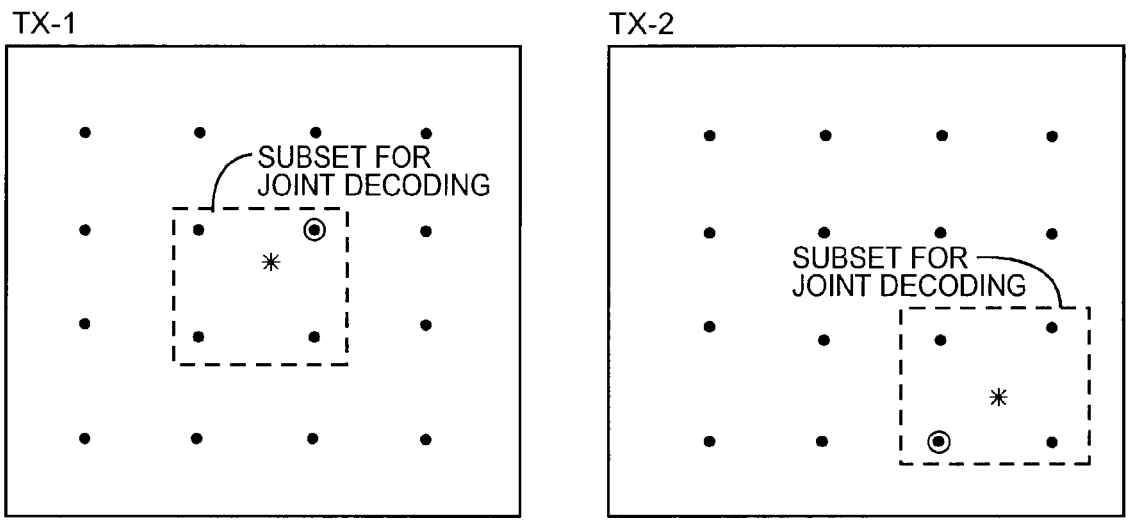
FIGS. 6A and 6B are constellation lattices from a transmitter and receiver's perspective and illustrate operation of the present invention.
Figure 6B:
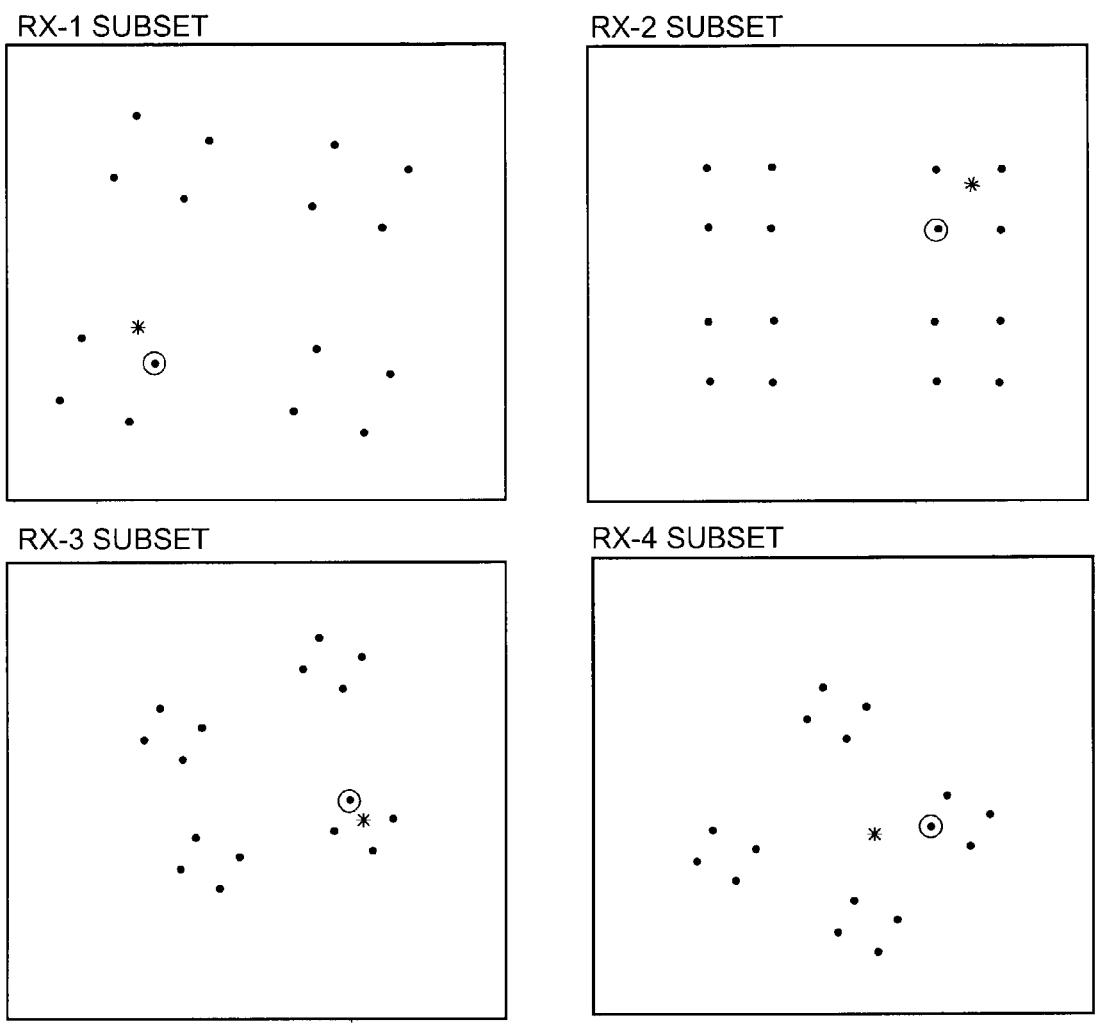

The basic concepts of a fast V-BLAST MLD decoder can be illustrated in FIGS. 6A and 6B. For the purpose of illustration, assume the transmit modulation is 16 QAM, and the MIMO configuration is two transmit antennas (M=2) and four receive antennas (N=4). Accordingly, there are 16 constellation points for basic 16 QAM modulation. Since there are two transmit antennas, the total possible points at the receiver is represented by $Q^M$, where Q is the modulation order and M is the number of transmit antennas. In this example, the total number of possible points at the receiver is 256 ($16^2$).

With particular reference to FIG. 6A, constellations from the perspective of each of the two transmit antennas are illustrated. Each constellation has 16 possible points, wherein the circled point represents the actual symbol being transmitted from the particular antenna. For reference, a ZF solution associated with the transmitted symbol is mapped onto the transmission constellation to illustrate the effect of the channel conditions on the transmitted symbol. As illustrated, the channel conditions may impact the transmitted symbol sufficiently, where the ZF solution may not be most proximate to the actual constellation point corresponding to the symbol transmitted.

Accordingly, the ZF function is used to map the received symbol back to a point on the transmit constellation lattice for each receive antenna. This provides the initial solutions corresponding to symbols transmitted from each transmit antenna. The initial solutions act as rough estimates of the received symbols. The initial solutions are then used to identify or determine search areas, which are smaller regions within the transmit constellation matrix, highlighted with dashed boxes and associated with a limited set of candidate constellation points. The smaller regions determined based on the initial solutions define a limited, multi-dimensional space in which to implement MLD decoding. The limited space from the perspective of each receive antenna is illustrated in FIG. 6B. Within the limited space illustrated for each of the four receive antennas, there are 16 points, which correspond to the four points within the limited space from each of the two transmit antennas. Thus, the number of points illustrated in the limited space is $4^2$, or 16. The asterisk represents the combination of symbols transmitted from the two transmit antennas as received at each of the four receive antennas. The circled constellation point represents the combination of the transmitted symbols.

As noted, MLD decoding is provided only for the limited space determined based on the ZF solutions, instead of throughout the entire constellation lattice as provided in FIG. 6A. The result of the MLD decoding will provide hard-decisions for the symbols transmitted from each of the transmit antennas. In one embodiment, the initial solutions are correlated with the nearest four constellation points based on the Euclidean distances. Using ZF or MMSE solutions to reduce the MLD decoding search set significantly reduces processing complexity by reducing the space in which MLD decoding would otherwise be required. The limited space determined based on the initial ZF solutions may correspond to any number of possible points in the constellation lattice or area therein. Accordingly, the limited area for MLD decoding can be significantly reduced, thus reducing the complexity of MLD. In the example provided, the present invention reduces the required MLD from an original constellation of 16 points to one of four points within the larger constellation (as shown in FIG. 6A). Thus, the number of points for MLD processing is reduced in a two-transmitter system from $16^2$=256 to $4^2$=16 points. Tests have shown that limiting MLD decoding to such a reduced set of constellation points as small as four can be done without performance loss.

A process flow is next described for carrying out an enhanced embodiment of the present invention wherein MLD decoding is iteratively carried out for groups of transmit antennas instead of for every transmit antenna at one time. Although the groups can be any size, the exemplary implementation operates on groups of two antennas. In this example, assume that there are four transmit antennas. In general, initial (ZF or MMSE) solutions are determined for each transmit antenna and used to group the transmit antennas into groups based on signal strength. In this example of four transmit antennas, there are two groups of two antennas. Next, the initial solutions for the weaker group are subtracted from the stronger group to form modified initial solutions. For each modified initial solution, a limited area about the modified initial solution is defined. Each of the limited areas will correspond to regions including constellation points proximate the modified initial solution. The initial solutions are used to define a limited, multi-dimensional space. A joint decoding technique, such as MLD, is implemented within the limited space to find a final solution for the strongest pair of transmit antennas. These final solutions are then multiplied by the corresponding channel matrix to provide a modified signal, which is subtracted from the received signal. The resulting signal should represent the signals transmitted from the next, and final (or weaker) in the example, pair of transmit antennas.

Figure 7:
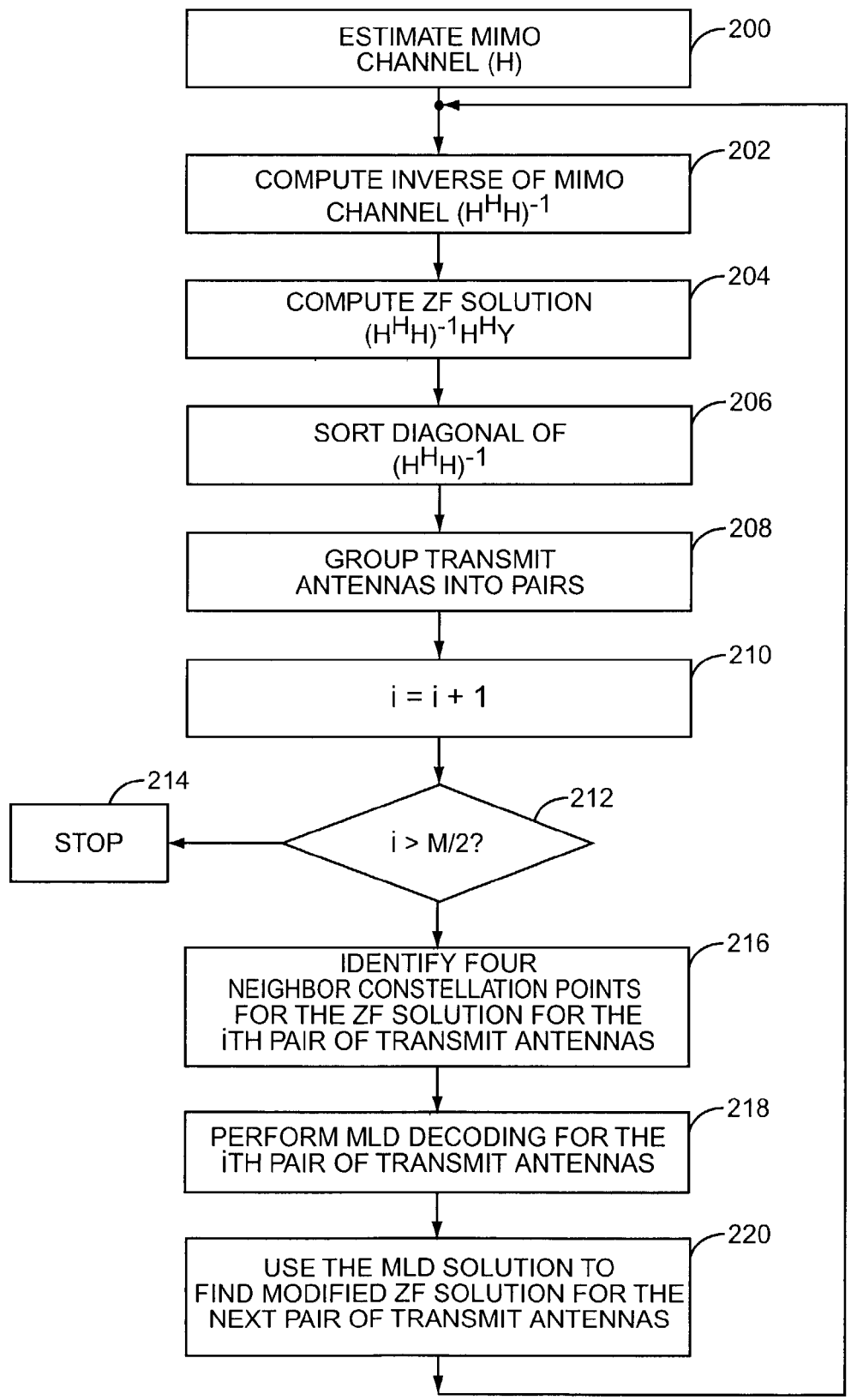
FIG. 7 is a flow diagram illustrating operation of one embodiment of the present invention.

A more detailed process flow for the latter embodiment is illustrated in FIG. 7. Accordingly, the channel matrix H is first determined (block 200). Next, the inverse of the channel matrix is calculated (block 202) to determine the ZF (or MMSE) initial solutions, preferably using the Moore-Penrose pseudoinverse of the channel matrix (block 204). The order in which to apply MLD decoding can be determined by sorting the norm of columns of the pseudoinverse of the channel matrix H (block 206). In this embodiment, the ordering is used to group the transmit antennas into pairs of antennas for MLD decoding (block 208), preferably based on signal strength.

Next, MLD decoding is applied for each transmit antenna pair. Initially, a variable i is set equal to i+1 (block 210). If i is greater than the number of pairs of transmit antennas, i>M/2 (block 212), the process is stopped (block 214). Otherwise, a defined number, such as four, of the closest or neighboring constellation points in the transmission constellation lattice to the ZF (or MMSE) function are identified for the ith pair of antennas (block 216). MLD decoding is then performed about the identified constellation points for the ith pair of transmit antennas to arrive at a final (MLD) solution (block 218). The final (MLD) solution in light of the channel conditions is then subtracted from the received signal to arrive at modified initial (ZF) solutions for the next pair of antennas (block 220). The process will repeat until a final (MLD) solution is provided for each pair of antennas. Notably, the group size may change from iteration to iteration. The advantages of the proposed approach follow. First, the MLD decoding complexity is independent of QAM modulation size. In the above example, the MLD searching range is reduced to the vicinity of four constellation points. Further, the MLD decoding is only applied to transmit antenna pairs and is a conditional MLD search based on the tentative solution of zero-forcing.

Those skilled in the art will recognize improvements and modifications to the preferred embodiments of the present invention. All such improvements and modifications are considered within the scope of the concepts disclosed herein and the claims that follow.

What is claimed is:

1. A method for decoding space time coded (STC) signals comprising:
    a) receiving STC signals originating from a plurality of transmit antennas of a remote transmitter;
    b) decoding the STC signals using a separate STC decoding technique to determine a plurality of initial solutions;
    c) identifying a selected area about each of the initial solutions, wherein the selected area is an area smaller than an entire constellation lattice;
    d) creating a decoding space corresponding to the selected areas; and
    e) decoding the STC signals within the decoding space using a joint STC decoding technique to determine a final solution representing symbols transmitted from the plurality of transmit antennas.

2. The method of claim 1 wherein the selected area corresponds to a limited set of constellation points in the constellation lattice containing constellation points corresponding to possible symbols transmitted from the plurality of transmit antennas.

3. The method of claim 1 wherein the selected area corresponds to a set of four constellation points in the constellation lattice containing constellation points corresponding to possible symbols transmitted from the plurality of transmit antennas.

4. The method of claim 1 wherein the decoding space is a limited space in a multi-dimensional constellation lattice corresponding to a limited set of constellation points.

5. The method of claim 1 wherein there is an initial solution for each of the plurality of transmit antennas.

6. The method of claim 1 wherein the separate STC decoding technique is zero-forcing.

7. The method of claim 1 wherein the separate STC decoding technique is minimum mean square error decoding.

8. The method of claim 1 wherein the joint decoding technique is maximum likelihood decoding.

9. The method of claim 1 wherein the STC signals are BLAST signals.

10. The method of claim 1, wherein the selected area is larger than a specific constellation point.

11. A method for decoding space time coded (STC) signals comprising:
    a) receiving STC signals originating from a plurality of transmit antennas of a remote transmitter;
    b) decoding the STC signals using a separate STC decoding technique to determine a plurality of initial solutions;
    c) selecting a group of the initial solutions associated with a group of the transmit antennas;
    d) removing initial solutions outside of the selected group of the initial solutions associated with the group of the transmit antennas to provide modified initial solutions for the group of the transmit antennas;
    e) identifying a selected area about each of the modified initial solutions, wherein the selected area is an area smaller than an entire constellation lattice;
    f) creating a decoding space corresponding to the selected areas; and
    g) decoding the STC signals within the decoding space using a joint STC decoding technique to determine a final solution representing symbols transmitted from the transmit antennas associated with the group of the transmit antennas.

12. The method of claim 11 further comprising:
    h) recreating an interference cancellation signal based on the final solution; and
    i) subtracting the interference cancellation signal from the STC signals to create modified STC signals.

13. The method of claim 12 wherein the modified STC signals and step b through i are iteratively repeated until the final solutions are obtained for each group of transmit antennas.

14. The method of claim 11 wherein the selected area corresponds to a limited set of constellation points in the constellation lattice containing constellation points corresponding to possible symbols transmitted from the plurality of transmit antennas.

15. The method of claim 11 wherein the selected area corresponds to a set of four constellation points in the constellation lattice containing constellation points corresponding to possible symbols transmitted from the plurality of transmit antennas.

16. The method of claim 11 wherein the decoding space is a limited space in a multi-dimensional constellation lattice corresponding to a limited set of constellation points.

17. The method of claim 11 wherein there is an initial solution for each of the plurality of transmit antennas.

18. The method of claim 11 wherein the separate STC decoding technique is zero-forcing.

19. The method of claim 11 wherein the separate STC decoding technique is minimum mean square error decoding.

20. The method of claim 11 wherein the joint decoding technique is maximum likelihood decoding.

21. An apparatus for receiving space time coded (STC) signals comprising:
    a) receiver circuitry for receiving and demodulating modulated STC signals to provide STC signals;
    b) an STC decoder for:
        i) receiving the STC signals originating from a plurality of transmit antennas of a remote transmitter;
        ii) decoding the STC signals using a separate STC decoding technique to determine a plurality of initial solutions;
        iii) identifying a selected area about each of the initial solutions, wherein the selected area is an area smaller than an entire constellation lattice;
        iv) creating a decoding space corresponding to the selected areas; and
        v) decoding the STC signals within the decoding space using a joint STC decoding technique to determine a final solution representing symbols transmitted from the plurality of transmit antennas.

22. The apparatus of claim 21 wherein the selected area corresponds to a limited set of constellation points in the constellation lattice containing constellation points corresponding to possible symbols transmitted from the plurality of transmit antennas.

23. The apparatus of claim 21 wherein the selected area corresponds to a set of four constellation points in the constellation lattice containing constellation points corresponding to possible symbols transmitted from the plurality of transmit antennas.

24. The apparatus of claim 21 wherein the decoding space is a limited space in a multi-dimensional constellation lattice corresponding to a limited set of constellation points.

25. The apparatus of claim 21 wherein there is an initial solution for each of the plurality of transmit antennas.

26. The apparatus of claim 21 wherein the separate STC decoding technique is zero-forcing.

27. The apparatus of claim 21 wherein the separate STC decoding technique is minimum mean square error decoding.

28. The apparatus of claim 21 wherein the joint decoding technique is maximum likelihood decoding.

29. The apparatus of claim 21 wherein the STC signals are BLAST signals.

30. An apparatus for receiving space time coded (STC) signals comprising:
  a) receiver circuitry for receiving and demodulating modulated STC signals to provide STC signals;
  b) an STC decoder for:
    i) receiving the STC signals originating from a plurality of transmit antennas of a remote transmitter;
    ii) decoding the STC signals using a separate STC decoding technique to determine a plurality of initial solutions;
    iii) selecting a group of the initial solutions associated with a group of the transmit antennas;
    iv) removing initial solutions outside of the selected group of the initial solutions associated with the group of the transmit antennas to provide modified initial solutions for the group of the transmit antennas;
    v) identifying a selected area about each of the modified initial solutions, wherein the selected area is an area smaller than an entire constellation lattice;
    vi) creating a decoding space corresponding to the selected areas; and
    vii) decoding the STC signals within the decoding space using a joint STC decoding technique to determine a final solution representing symbols transmitted from the transmit antennas associated with the group of the transmit antennas.

31. The apparatus of claim 30 wherein the STC decoder further:
    viii) recreates an interference cancellation signal based on the final solution; and
    ix) subtracts the interference cancellation signal from the STC signals to create modified STC signals.

32. The apparatus of claim 31 wherein the modified STC signals become the STC signals and steps ii) through ix) are iteratively repeated until final solutions are obtained for each group of transmit antennas.

33. The apparatus of claim 30 wherein the selected area corresponds to a limited set of constellation points in the constellation lattice containing constellation points corresponding to possible symbols transmitted from the plurality of transmit antennas.

34. The apparatus of claim 30 wherein the selected area corresponds to a set of four constellation points in the constellation lattice containing constellation points corresponding to possible symbols transmitted from the plurality of transmit antennas.

35. The apparatus of claim 30 wherein the decoding space is a limited space in a multi-dimensional constellation lattice corresponding to a limited set of constellation points.

36. The apparatus of claim 30 wherein there is an initial solution for each of the plurality of transmit antennas.

37. The apparatus of claim 30 wherein the separate STC decoding technique is zero-forcing.

38. The apparatus of claim 30 wherein the separate STC decoding technique is minimum mean square error decoding.

39. The apparatus of claim 30 wherein the joint decoding technique is maximum likelihood decoding.

* * * * *